(12) United States Patent
Prud'homme et al.

(10) Patent No.: US 6,566,454 B2
(45) Date of Patent: May 20, 2003

(54) AMPHOTERIC STABILIZATION OF CRUDE PETROLEUM

(75) Inventors: Robert K. Prud'homme, Lawrenceville, NJ (US); Henry S. Ashbaugh, Santa Fe, NM (US)

(73) Assignee: The Trustees of Princeton University, Princeton, NJ (US)

( * ) Notice: Subject to any disclaimer, the term of this patent is extended or adjusted under 35 U.S.C. 154(b) by 0 days.

(21) Appl. No.: 09/874,076

(22) Filed: Jun. 5, 2001

(65) Prior Publication Data

US 2003/0027933 A1 Feb. 6, 2003

(51) Int. Cl.$^7$ .................... C08F 293/00; C01M 143/12; C08L 53/00
(52) U.S. Cl. .................. 525/314; 525/242; 525/240; 508/591
(58) Field of Search ............... 525/314, 242, 525/240; 508/591

(56) References Cited

U.S. PATENT DOCUMENTS

| | | | |
|---|---|---|---|
| 3,627,838 A | 12/1971 | Ilnyckyj, et al. | 260/87.3 |
| 4,282,132 A | 8/1981 | Benda et al. | 260/30.2 |
| 5,310,814 A | 5/1994 | Struglinski et al. | 525/314 |
| 5,543,469 A | 8/1996 | Struglinski et al. | 525/314 |
| 5,703,171 A | 12/1997 | Struglinski et al. | 525/314 |
| 5,945,485 A * | 8/1999 | Struglinski et al. | 525/314 |
| 6,254,650 B1 * | 2/2001 | Dounig | 44/393 |

OTHER PUBLICATIONS

Billmeyer., *Textbook of Polymer Sciecne*, 2$^{nd}$ $^{ed.}$, 1971, Wiley–Interscience., John Wiley & Sons, pp 318.

Brandrup J. et al., "D–source–based nomenclature for copolymers", *Polymer Handbook*, 1989, 3$^{rd}$ ed, p. I/34–I/36.

D. Ritcher et al., Polymer Aggregates w/ crystalline cores: The system polyethylene–poly(ethylenepropylene), *Macromolecules*, 1997, vol. 30, pp 1053–1068.

E. Perry, et al., "Petroleum and complex–mixture distillation", *Perry's chemical Engineers Handbook*, 1997, 7$^{th}$ ed, ch 13, pp 85–95.

E. Perry et al., "fluid and particle dynamics", *Perry's Chemical Engineers Handbook*, 1997, 7$^{th}$ ed., 6–4.

G. Ver Strate, et al., "Ethylene–propylene copolymers: degree of crystallinity and composition", *J. Pol. Sci. Physics*, 1971, a2, 9, pp 127–141.

G. Ver Strate, et al. "Near monodisperse ethylene–propylene copolymers by direct ziegler–natts polymerization preparation, characterization, properties",*Macromolecules*, 1988, 21, pp 3360–3371.

Halasa A. F. et al., Organolithium catalysis of olefin and diene polymerization, *Adv. In Organ. Chem*, 1980, 18, pp 55–97.

W. Leube, et al., "Wax crystal modification for fuel oils by self aggregating crystallizable hydrocarbon block. Copolymers", *Energy and Fuels*, 2000, 14, pp 419–430.

Ashbaugh, H.S., et al., "Flow improvement of waxy oils mediated by self–aggregating partially crystallizable diblock copolymers," *J. of Rheology*, 2002, 46(4), pp.763–776.

* cited by examiner

*Primary Examiner*—James J. Seidleck
*Assistant Examiner*—Olga Asinovsky
(74) *Attorney, Agent, or Firm*—Woodcock Washburn LLP

(57) ABSTRACT

The present invention relates to a method of using a block copolymer comprising monomeric units of 1,4-butadiene and at least one other comonomer addition products to lower the gel point of crude petroleum. The block copolymer comprises at least 10% by weight of at least one crystallizable block and at least one low crystallinity block.

17 Claims, No Drawings

AMPHOTERIC STABILIZATION OF CRUDE PETROLEUM

FIELD OF THE INVENTION

This invention relates to methods of using block copolymers to lower the cold flow temperature (pour point) of crude petroleum.

BACKGROUND OF THE INVENTION

Typical crude petroleum contains paraffinic and isoparaffinic waxy components which are capable of crystallizing. Concentrations of waxy components are much higher in crude petroleum as compared to refined products such as fuels, fuel oil, lubricating oil and the like. Waxy components begin to crystallize in crude petroleum as the petroleum is cooled to temperatures below the petroleum's gel point temperature. Crystallization of waxy components of crude petroleum is undesirable because it increases petroleum viscosity at low temperatures making it difficult for the petroleum to be pumped or poured.

Certain copolymers are known as fuel oil and lubricating oil viscosity modifying additives. See D. Richter et al., Polymer Aggregates with Crystalline Cores: The System Polyethylene-Poly(ethylenepropylene), *Macromolecules*, Vol. 30, pp. 1053–1068 (1997). The copolymers generally interact with waxy components of fuel oil, by multiple nucleation of precipitates, reducing the size of precipitate nuclei with a concomitant reduction in oil viscosity. See W. Leube, et al., Wax Crystal Modification for Fuel Oils by Self Aggregating Crystallizable Hydrocarbon Block Copolymers, *Energy and Fuels*, Vol. 14, pp. 419–430 (2000).

Traditionally, copolymer additives for this purpose are formed by free-radical graft copolymerization of an alkyl ester of acrylic or of methacrylic acid, alone or in combination with a non-paraffin specific monomer such as styrene. In a similar spirit, flow improving copolymers comprisined of ethylene, a paraffin specific segment, and a vinyl acetate, a paraffin non-specific segment, have been synthesized by radical polymerization as well. See U.S. Pat. No. 4,282,132 to Benda et al. which discloses lubricating oil additives, and U.S. Pat. No. 3,627,838 to Ilnyckyj et al. which discloses a process for manufacturing potent pour depressants. Each of the references cited herein are incorporated herein by reference.

More recently, conventional copolymer additives for this purpose are formed by polymerizing one or more conjugated dienes and, optionally, one or more monoalkenylarene compound in solution in the presence of an ionic initiator to form a living polymer. For the purposes of the present invention living polymer is used consistently with Billmeyer, Textbook of Polymer Science, 2d Ed., Wiley-Interscience, John Wiley and Sons, page 318 (1971).

Examples of conventional compounds can be found in U.S. Pat. No. 5,310,814 to Strulinski et al., U.S. Pat. No. 5,543,469 to Strulinski et al., and U.S. Pat. No. 5,703,171 to Strulinski et al. U.S. Pat. No. 5,310,814 discloses hydrogenated polybutadiene comprising monomeric units of 1,4-butadiene and 1,2-butadiene addition products. The copolymer comprises at least 10% by weight of at least one crystallizable segment and at least one low crystallinity segment. U.S. Pat. No. 5,543,469 discloses hydrogenated block copolymers of butadiene and at least one other diene. The copolymer comprises at least 10% by weight of at least one crystallizable segment and at least one low crystallinity segment. U.S. Pat. No. 5,703,171 discloses hydrogenated polybutadiene comprising monomeric units of 1,4-butadiene and 1,2-butadiene addition products. The copolymer comprises at least 10% by weight of at least one crystallizable segment and at least one low crystallinity segment. Each of the references cited herein are incorporated herein by reference.

Traditional lubricating oil or diesel fuel polymer additives have not been synthesized to react specifically with the various components of crude petroleum. The compounds that exist in crude petroleum are significantly different and more diverse than those compounds present in lubricating oils or diesel fuel.

Further, traditional methods of modifying lubricating oil and fuel oil viscosity involve adding copolymers to the lubricating oil or fuel oil as a cold flow additive. The copolymers of polybutadiene disclosed by the prior art are synthesized to form small, uniformly sized wax crystals when added to diesel fuel or lubricating oils. Uniformity of small crystal size is a necessary goal of the traditional copolymer additives because larger crystals would clog fuel filters or hamper the lubrication properties of lubricating oils. As a result, use of conventional lubricating oil or diesel fuel copolymer additives is considered undesirable to lower the gel point of crude petroleum. It is thought that the waxy content of crude petroleum will overload a traditional copolymer additive's capacity to form crystals and synthesize undesirable non-uniform large crystals.

Similarly, traditional methods of modifying lubricating oil and fuel oil viscosity involve the use of copolymer additives that are used in oils that do not solidify at room temperature. Crude petroleums that solidify at low temperatures are believed to overload the ability of conventional lubricating oil or diesel fuel copolymer additives ability to form waxy crystals. Use of conventional lubricating oil or diesel fuel copolymer additives are considered undesirable to lower the gel point of crude petroleum because many crude petroleum compositions solidify at room temperature. Hence, methods which address these needs have long been sought.

SUMMARY OF THE INVENTION

The present invention provides methods of lowering the gel point temperature of crude petroleum. The methods comprise providing a block copolymer and admixing the block copolymer with a crude petroleum. As described herein crude petroleum is unrefined petroleum or partially refined petroleum. Partially refined petroleum is crude petroleum that has been processed to some extent by a form of refining but still retains a significant quantity of paraffinic or isoparaffinic components and can suffer from an undesirably high gel point. Thus, partially refined petroleum as described herein is the liquid, near liquid, or partially solidified product of typical refining techniques that include but are not limited to atmospheric tower fractionation, vacuum tower fractionation, catalytic cracking, light ends fractionation, or processing with a coking unit. Partially refined petroleum may include heavy naptha, light naptha, catalytic naptha, coker naptha, cycle oil, gas oil, and similar refined products or petroleum fractionation distillates or bottoms. James H. Gary, Glenn E. Handwork, *Petroleum Refining*, Marcel Dekker (1975); Ed.Perry, Robert H., Green, Don W., *Perry's Chemical Engineers Handbook*, 7th ed., Ch. 13, p.85–95 (1997); Watkins, R. N., *Petroleum Refinery Distillation*, 2d ed. (1979). Paraffins and isoparaffins as described herein are waxy alkanes that precipitate upon the cooling of a crude petroleum. Paraffins and isoparafins have a relatively low specific gravity when compared to other petroleum components such as olefins, napthenes, or aromatic compounds.

The block copolymers of the present invention are composed of at least 10% by weight of a first block and at least 10% by weight of a second block. The first block of the block copolymer is a polyalkylene having at least about 30% crystallinity. Preferably the first block has a crystallinity between about 35% and about 90%. Preferably the first block is formed from a butadiene, especially a 1,4 butadiene.

The second block is a polyalkylene having less than about 30% crystallinity. The polyalkylene of the second block is preferably branched (with long or short chain branches), substituted, or both. If substituted, the second block is substituted with at least one hydroxyl, halo, or amino group. The second block is preferably formed from an isoprene or butadiene synthesized under conditions which give high 1,2 polybutadiene product.

Crystallinity percentage is determined generally by the following formula:

$$\frac{[\text{Weight Crystallized Polymer}]}{[\text{Total Weight of the Polymer}]} = [\text{Percentage of Crystallinity by Weight}]$$

Specific calculation of the percentage of crystallinity can be measured by techniques such as those defined in G. Ver Strate, Z. W. Wilchinsky, *J. Pol. Sci. Physics*, A2, 9, 127 (1971), which is incorporated herein by reference. The degree of crystallinity measured is a function of the sample's annealing history. Crystallinity also depends on temperature, diluent, and the composition of the block copolymer.

The block copolymers of this invention are deemed to be amphoteric in that they have both crystalline and relatively non-crystalline segments within the same polymer molecule. The low crystalline blocks have a relatively low probability of reacting and interacting with the waxy components of a petroleum while the high crystalline blocks have a relatively high probability of interacting with a petroleum's waxy components.

The alternating crystalline—noncrystalline structure of the block copolymers described herein enables the block copolymers to be soluble in petroleum while still selectively interacting with the parraffinic and isoparaffinic components found therein. The amphoteric structure of the block copolymers form waxy crystals without allowing the wax crystals to interact in such a way that the petroleum undergoes gelation. The alternating noncrystalline blocks are believed to act as a steric barrier to help prevent excessive intermolecular association among wax crystals below a petroleum's gel point temperature. Significant premature block copolymer association above the gel point temperature would hinder a block copolymer's ability to improve a petroleum's viscometric characteristics.

The requisite block copolymer is added to a crude petroleum in an amount sufficient to reduce the gel point temperature of the petroleum by at least about 2 degrees Centigrade. Preferably the block copolymer is added to the crude petroleum in an amount sufficient to reduce the gel point temperature of the petroleum by at least 3 degrees Centigrade. The gel point temperature ($T_{gel}$) of a petroleum is the temperature at which paraffinic and isoparaffinic waxy compounds found in petroleum form crystalline clouds upon cooling of the petroleum which leads to viscosity increases and a lack of ability to flow and transport the petroleum in pipelines. $T_{gel}$ is determined rheologically as the temperature at which the viscosity increases dramatically upon cooling due to the precipitation of high molecular weight paraffins from the crude petroleum solution. One method of determining the gel point temperature of a petroleum is to plot petroleum viscosity as a function of petroleum temperature. The gel point temperature is the intersection point of the line defined by high temperature viscosity data and the line defined by the viscosity transition region data.

The block copolymers described herein preferably have weight average molecular weights less than about 2,000,000 as measured by gel permeation chromatography (GPC) using tetrahydrofuran (THF) and light scattering. The block copolymers preferably have weight average molecular weights between about 1,000 and 200,000, more preferably between about 2,000 and 50,000, and still more preferably between about 4,000 and 20,000.

The methods of the present invention provide for the improvement of the low temperature viscometric characteristics of crude petroleum while improving their shear stability as well. The present invention remedies the shortcomings of traditional methods of using polymers to improve a petroleum's viscometric characteristics. Viscometric improvement is measured by the viscosity index of the crude petroleum. Viscosity Index, or, V.I., is the measurement of a petroleum's ability to accommodate an increase in temperature with a minimum decrease in viscosity. The greater a petroleum's viscosity index, the lower its tendency to change viscosity with temperature. To determine the viscosity index of a test petroleum with known viscosity at 40° Centigrade and at 100° Centigrade, the petroleum is compared to two standard oils having an arbitrary V.I. of 0 and 100, respectively, and both having the same viscosity at 100° Centigrade as the test petroleum. The following formula is used, in accordance with test method ASTM D 2270:

$$V.I. = L - U/L - H \times 100$$

where L is the viscosity at 40° Centigrade of the oil with a V.I. of 0, H is the viscosity at 40° Centigrade of the oil with a V.I. of 100, and U is the viscosity at 40° Centigrade of the test oil. There is an alternative calculation, also in ASTM D 2270, for oils with a V.I. above 100. The V.I. of paraffinic oils is inherently high, but is low in naphthenic oils, and even lower in aromatic oils (often below 0). *Encyclopedia for the User of Petroleum Products* Exxon Company, U.S.A. (1997). Viscosity is the ratio of shear stress to shear rate measured in pounds per foot second. Shear rate is the velocity gradient perpendicular to the flow of a fluid measured in units of reciprocal seconds. Shear stress is the tangential force per unit area measured in pounds per foot. Ed.Perry, Robert H., Green, Don W., *Perry's Chemical Engineers Handbook*, 7th ed., 6–4 (1997). Viscosity is preferably determined by a viscometer that produces a viscometric flow field. This may be provided by a controlled strain rheometer (such as an RFSII manufactured by Rheometrics using a couette geometry) or a controlled stress rehometer (such as a Rheometrics DSR2000 manufactured by Rheometrics using a covette or parallel plate geometry).

The methods of the present invention use block copolymers with amphoteric properties to react or interact with waxy components of crude petroleum, by multiple nucleation of precipitates, thereby reducing the size of precipitate nuclei with a concomitant reduction in oil viscosity. In addition, block copolymers co-crystallize with waxy components and sterically stabilize wax platlettes with a concomitant reduction in oil viscosity. Both mechanisms may occur in parallel or sequentially such that the mode of action is non-limiting. Certain of the block copolymers described herein comprise a first block forming at least about 10% weight percent of the block copolymer and a second block forming at least about 10% by weight of the block copolymer. A block copolymer is a polymer comprising molecules in which there is a linear arrangement of blocks, a block being defined as a portion of a polymer molecule in which the monomeric units have at least one constitutional or configurational feature absent from the adjacent portions. In a block copolymer, the distinguishing feature is constitutional, i.e., each of the blocks comprises units derived from a characteristic species of monomer. See Brandrup, J. and Immergut, E. H., *Polymer Handbook*, 3d ed., p.I/34 (1989).

The methods of the present invention are directed to the incorporation of block copolymers preferably comprised of monomeric units derived from the addition products of butadiene and at least one comonomer. The butadiene and comonomer are polymerized, preferably by addition polymerization, to form precursor block copolymers comprising an amount of polymerized 1,4-butadiene and at least one other comonomer. The precursor block copolymers are then preferably hydrogenated to substantially saturate the olefinic bonds of the precursor block copolymers to form the block copolymers.

The comonomers described herein are comprised of conjugated dienes, preferably $C_5$ to about $C_{24}$ dienes, 1,2-addition butadienes, or anionically polymerizable substituted ethylenes, such as styrene or acrylics, such as methacrylate. The comonomers are preferably isoprene, 1,4-butadiene, and 1,2-butadiene. Preferably, when the comonomers are 1,4-butadiene and 1,2-butadiene, synthesis of block copolymers is accomplished by altering the reaction conditions and/or solvent used during 1,4-butadiene polymerization so that 1,2-butadiene is polymerized. Conversely, the reaction conditions and/or solvent used during 1,2-butadiene polymerization are altered so that 1,4-butadiene is polymerized.

The polymerized block copolymers contain at least one crystallizable segment, or first block, and at least one low crystallinity segment, or second block. The first block, which has at least about 30% crystallinity, comprises at least an average of about 10 weight percent of the block copolymer chain and preferably contains an average 1,4-polybutadiene content of at least about 20 mole percent, preferably at least about 30 mole percent.

The second block of relatively low crystallinity, less than 30%, has an average 1,4-polybutadiene content of less than 30 mole percent, preferably less than about 20 mole percent, and is preferably rich in substituted methylene units. The second block correspondingly contains an average of at least about 20 mole percent, more preferably at least about 22 mole percent, and even have preferably at least about 24 mole percent substituted methylene units, CH—R, where R is a $C_1$ to $C_8$ alkyl group, either branched or straight chain, or R is

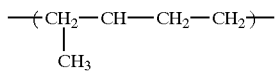

substituted with at least one hydroxyl, an amino, or halo group. These substituted methylene units result from, for example, the hydrogenation of 1,2-addition butadiene, isoprene, or the hydrogenation of the polymerization products of other substituted alkylenes such as styrene. For example, hydrogenating the polymerization product of 1,4-addition isoprene yields the recurring unit:

The second block can contain, in addition to the hydrogenated comonomer, hydrogenated 1,2-addition butadiene and 1,4-addition butadiene and minor amounts, i.e., from 0 to 5 mole percent, of other conjugated diene polymerization products. Such other conjugated dienes include those having from 5 to 24 carbon atoms. Thus, for example, the second block may contain the hydrogenated polymerization products of 1,2-butadiene, i.e., poly-1,2-butadiene, 1,4-butadiene, i.e., hydrogenated poly-1,4-butadiene, and isoprene, i.e., hydrogenated polyisoprene.

The block copolymers of the present invention preferably have a molecular weight distribution (Mw/Mn) of about 2.0 or less, preferably about 1.8 or less, and more preferably about 1.4 or less, as determined by SEC as discussed in G. Ver Strate, C. Cozewith, S. Ju, in *Macromolecules,* 21, 3360, 1988.

The block copolymers of the invention may also contain up to about 10 mole percent, preferably less than 5 mole percent of a hydrogenated polymerization product of other monomers such as, for example, monovinyl arenes such as styrene or substituted styrene methacrylates, vinyl pyridines or other anionically polymerizable monomers.

The amount of the first block which is present in the block copolymers described herein is in general dependent upon the relative amounts of 1,4-butadiene present in the precursor polymer. The first block comprises at least about 10 weight percent, preferably from about 10 to about 90 weight percent, more preferably from about 20 to about 85 weight percent, and still more preferably from about 40 to 65 weight percent of the total block copolymer chain. Correspondingly, the precursor block copolymer contains at least about 10 weight percent, preferably at least about 20 weight percent (e.g., from about 25 to about 60), and more preferably at least about 35 weight percent of 1,4-butadiene. Generally, the greater the amount of 1,4-butadiene present in the precursor block copolymers, the larger the first block in the block copolymers.

Not all of the 1,4-butadiene present in the precursor block copolymers forms part of a first block upon hydrogenation. Some of the hydrogenated 1,4-butadiene may be present in a second block. Thus, for example, the second block may comprise the hydrogenation products of isoprene (either 1,4- or 3,4-addition polyisoprene), 1,4-addition butadiene, and 1,2-addition butadiene.

The first block can also contain some of the hydrogenation product of 1,2-butadiene, isoprene (1,4- and or 3,4-), etc. provided the amounts of those other hydrogenated moieties are insufficient to lower the average 1,4-polybutadiene content of the first block below about 20 mole percent.

Block copolymers of the present invention are preferably produced by anionic polymerization followed by hydrogenation of butadiene and at least one comonomer. Block copolymers comprised of the hydrogenated reaction products of butadiene and isoprene wherein the 1,4-configuration predominates are preferred. Other species may also be found in the block copolymer including those obtained from 1,2-addition or 3,4-addition. For example, the 1,2-addition of butadiene will yield a recurring structure represented by the formula:

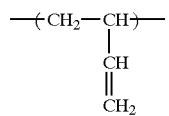

Hydrogenation of this structure results in a structure represented by the formula:

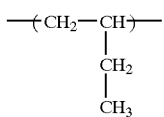

Therefore, a hydrogenated block copolymers of butadiene contains the following species:

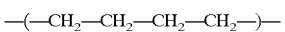

obtained from the hydrogenation of 1,4-butadiene;

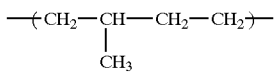

obtained from the hydrogenation of 1,4-isoprene;

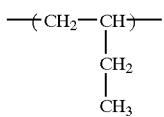

obtained from the hydrogenation of 1,2-addition butadiene.

The recurring structural units other than those obtained by the hydrogenation of the 1,4-addition and at least one comonomer may be present in both the first block and the second block. If they are present in the crystallizable segments of the block copolymers, the first block, however, they are present in amounts which are insufficient to affect the crystallizable characteristics of the first block.

Comonomers utilized to form the second block of the block copolymer are preferably $C_5$–$C_{24}$ conjugated dienes. Preferred conjugated dienes are represented by the formula:

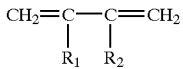

wherein $R_1$ is a $C_1$ to $C_8$ alkyl group, and $R_2$ is a hydrogen or independently of $R_1$ a $C_1$ to about $C_8$ alkyl group. The alkyl groups represented by $R_1$ and $R_2$ may be straight chain or branched. It is preferred that the $R_1$ and $R_2$ alkyl groups are straight chain alkyl groups. Preferred conjugated diene monomers are those represented by the formula:

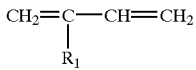

wherein $R_1$ is defined as above. The more preferred comonomer is isoprene.

The first block present in the block copolymers are comprised predominantly of methylene units which are, inter alia, provided by the hydrogenation of 1,4-butadiene present in the precursor block copolymers. Thus, polymerizing butadiene monomer:

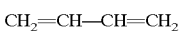

by 1,4-addition yields a precursor polymer segment containing recurring structural unit of the formula:

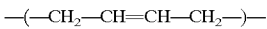

Hydrogenating these precursor polymer chains yield polymer segments containing the following recurring structural unit:

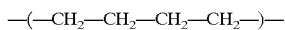

i.e., containing only methylene units. This recurring structural unit, provided it is sufficiently long, such as, for example having at least about 13 methylene units, forms the crystallizable segments, or first block of the block copolymers.

There are two requirements that must be fulfilled in order for a segment to be crystallizable. The first requirement is that the first block have an average 1,4-polybutadiene content of at least about 20 mole percent, preferably at least about 30 weight percent (e.g., from about 20 to about 80 weight percent). The second is that the methylene units be in sequences sufficiently long to impart crystallinity to said segment. Generally, these sequences are at least 11 methylenes or longer, preferably at least 15 methylenes or longer, and more preferably at least about 19 methylenes or longer.

Preferred block copolymers of the present invention are comprised of butadiene and isoprene predominately in the 1,4-configuration in the precursor block copolymers. Preferably there are at least about 20 mole percent of the butadiene and isoprene in the 1,4-configuration in the precursor block copolymers. The precursor block copolymers contain at least an amount of butadiene units in the 1,4-configuration sufficient to provide hydrogenated block copolymers containing at least one first block comprising at least about 20 weight percent of the block copolymers.

The crystallizable segments, or first blocks, referred to hereinafter are generally derived from the hydrogenation of the precursor block copolymers containing 1,4-configuration butadiene. The low crystallinity segments, or second blocks, referred to hereinafter are generally derived from the hydrogenation of the precursor block copolymers containing isoprene in the 1,2-, 3,4-, and 1,4 configuration as well as butadiene in the 1,4- and 1,2-configuration. Polymerizing isoprene monomer and butadiene monomer by 1,4-addition yields a precursor polymer chains containing the following recurring structural units:

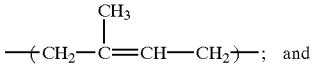

Hydrogenating these precursor block-copolymers yields block copolymer chains containing the following recurring structural unit:

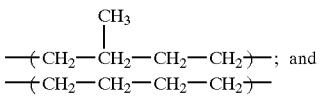

Where there are relatively large amounts of these substituted methylene moieties in a polymer block, generally greater or equal to about 22 mole percent, the resulting hydrogenated polymer blocks are low crystallinity segments, or second blocks. The segment containing at least about 20 mole percent 1,4-polybutadiene units, and if these methylene segments are of sufficient length, are high crystalline segments, or first blocks.

The segments derived from the hydrogenation of the 1,4-addition product of two moles of isoprene for every mole of 1,4-butadiene:

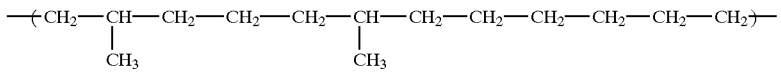

will generally not be first blocks because they are relatively rich in substituted methylene units, and the methylene sequences are not sufficiently long. Segments containing the recurring structural unit:

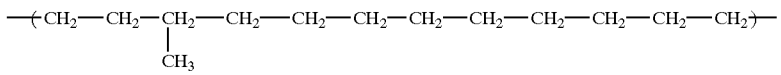

derived from the hydrogenation of the 1,4-addition of two moles of butadiene for every mole of isoprene, will be first blocks since they contain at least 30 mole percent 1,4-polybutadiene units, and since they contain uninterrupted methylene sequences containing at least about 11 methylene units.

The block copolymers of the present invention will contain at least one high crystalline segment, or first block, rich in methylene units, hereinafter called an "A" block for illustration purposes, and at least one low crystalline segment relatively rich in substituted methylene units, hereinafter called a "B" block for illustration purposes. The block copolymers useful in this invention can be represented by the formula:

 (III)

 (IV)

 (V)

wherein $A_1$, $A_2$, and $A_3$ are relatively high crystalline blocks; $B_1$, $B_2$ and $B_3$ are relatively low crystalline blocks; and X is an integer between about 0 and about 3. $A_1$, $A_2$, and $A_3$ can be the same or different, $B_1$, $B_2$ and $B_3$ can be the same or different.

When X=0, the block copolymer's middle block, i.e., $A_2$ or $B_2$ block, is positioned between two blocks having a different crystallinity compared to the middle block, i.e. $B_1/B_3$ or $A_1/A_3$. The middle block can be positioned substantially in the center of the polymer chain (that is, the $B_1/B_3$ or $A_1/A_3$ blocks can be substantially the same molecular weight and the sum of the molecular weight of the $B_1/B_3$ or $A_1/A_3$ blocks can be substantially equal to the molecular weight of the $A_2$ or $B_2$ block), although this is not essential to the practice of this invention.

Preferably, the A blocks and B blocks of the block copolymers described herein are located along the block copolymer chains so that only a limited number of the copolymer chains can associate before the steric problems associated with packing the low crystallinity B segments prevents further agglomeration. In the case where X is one or larger it is important that the $B_1$, $B_2$ and $B_3$ blocks be sufficiently large to prevent association of the A blocks from different polymer chain.

The A blocks of the block copolymers of this invention comprise the 1,4-addition product of butadiene which has been hydrogenated, but can also comprise at least one other comonomer, provided the 1,4-polybutadiene content of the A block is at least about 30 mole percent and a majority of the methylene sequences are sufficiently long, e.g., contain at least about 11 methylene units. The B blocks comprise a mixture of hydrogenated butadiene in the 1,2-configuration and the 1,4-configuration and at least one other conjugated diene and have a 1,4-polybutadiene content not greater than about 20 mole percent. The B blocks can contain amounts of hydrogenated 1,4-configuration butadiene monomers, i.e., 1,4-polybutadiene units, provided the total methylene content of said segments does not exceed about 20 mole percent.

In a preferred embodiment, hydrogenated block copolymers comprising a block of 1,4-butadiene and at least one other conjugated diene, preferably isoprene, contains at least one high crystalline block and at least one low crystalline block. Such block copolymers may be represented by formula III described hereinbefore. Preferably, A blocks are comprised predominantly or solely of methylene units derived from the polymerized 1,4-butadiene which has subsequently been hydrogenated. B blocks contain adequate substituted methylenes to render the blocks of low crystallinity and may generally be derived, from homopolymerized isoprene which has been hydrogenated.

In forming block copolymers of the structure $—A_1—B_1—$ butadiene monomer is first reacted with the "living" isoprene segment. The butadiene is homopolymerized substantially via 1,4-addition (generally there may be some fraction of 1,2-butadiene addition, although this may be kept to a minimum by appropriate reaction conditions), to form a precursor block copolymer segment A' containing recurring structures represented by the formula:

—(—CH2-CH=CH—CH2-)$_{a'}$- wherein a' is a number of at least 1. Upon hydrogenation these structures become:

—(CH2-CH2-CH2-CH2-)$_{a}$-

Upon completion or substantial completion of polymerization of the butadiene, isoprene monomer is introduced and then polymerized substantially by 1,4-addition, with some residual fraction of 3,4-addition, to form a precursor block copolymer $B_1'$ segment containing a recurring structure represented by the formula:

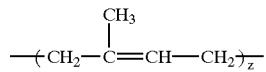

wherein Z is a number of at least 1. Upon hydrogenation these structures become:

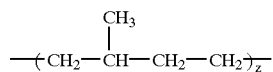

Complete or substantially complete homopolymerization of isoprene yields the hydogenated block copolymers of formula III. Alternatively, block copolymers represented by formula III can be prepared by altering reaction conditions and/or solvent present during the initial polymerization step.

In another preferred embodiment, hydrogenated block copolymers comprising a block of 1,4-butadiene and at least one other conjugated diene, preferably isoprene, contains at least one high crystalline block and at least one low crystalline block. Such block copolymers may be represented by formula IV described hereinbefore. Preferably, $A_1$ and $A2$ are comprised predominantly or solely of methylene units derived from the polymerized 1,4-butadiene which has subsequently been hydrogenated. $B_1$, $B_2$ and $B_3$ contain adequate substituted methylenes to render the blocks of low crystallinity and may generally be derived, from homopolymerized isoprene which has been hydrogenated.

In forming block copolymers of the structure $B_1$—$A_2$—$B_3$, isoprene is first polymerized substantially by 1,4-addition, with some residual fraction of 3,4-addition, to form a precursor block copolymer $B_1'$ segment containing a recurring structure represented by the formula:

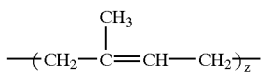

wherein Z is a number of at least 1. Upon hydrogenation these structures become:

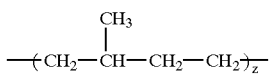

Upon complete or substantially complete homopolymerization of isoprene, butadiene monomer is reacted with the "living" isoprene segment. The butadiene is homopolymerized substantially via 1,4-addition (generally there may be some fraction of 1,2-butadiene addition, although this may be kept to a minimum by appropriate reaction conditions), to form a precursor block copolymer segment A' containing recurring structures represented by the formula:

—(—CH2-CH═CH—CH2-)$a'$- wherein a' is a number of at least 1. Upon hydrogenation these structures become —(—CH2-CH—CH2-CH2-)$a$-

Upon completion or substantial completion of polymerization of the butadiene, isoprene monomer is again introduced and reaction is resumed with the precursor block copolymer B1'-A2'-, with A2' being the "living" butadiene block. The homopolymerization of isoprene is continued to form a precursor block copolymer segment B3' containing the same recurring structure as precursor block copolymer segment B1'. The precursor block copolymer containing segments B1'-A2'-B3' is then hydrogenated to form hydrogenated block copolymers of structure B1-A2-B3. Alternatively, block copolymers represented by formula IV can be prepared by altering reaction conditions and/or solvent present during the initial and subsequent polymerization steps.

The present invention also relates to novel segmented hydrogenated block copolymers of butadiene and at least one other comonomer wherein the block copolymer's chain contains at least one crystallizable segment rich in methylene units and at least one low crystallinity block relatively rich in substituted methylene units, wherein the low crystallinity block copolymer segment is characterized in the unoriented bulk state after at least about 48 hours annealing at 23 degrees Centigrade by a degree of crystallinity of less than about 0.2% at 23 degrees Centigrade, and wherein the block copolymer's chain is intramolecularly heterogeneous. The crystallizable segments comprise an average of from about 20 to 90 weight percent, preferably from about 25 to 85 weight percent, and more preferably from about 30 to about 80 weight percent of the total block copolymer chain, and contain an average 1,4-polybutadiene content which is at least about 20 mole percent, preferably at least about 30 weight percent. The low crystallinity block copolymer segments comprise an average of from about 80 to 10 weight percent, preferably from about 75 to 15 weight percent, and more preferably from about 70 to 20 weight percent of the total block copolymer chain, and have a 1,4-polybutadiene content not greater than about 20 mole percent. The block copolymers in accordance with the present invention comprise intramolecularly heterogeneous chains, with substantially each chain containing both high crystalline and low crystalline segments.

The block copolymers of the present invention are less likely to interact with crude petroleum above the gel point temperature. Reaction of the block copolymer and waxy components of a petroleum above the gel point temperature will retard the block copolymer's ability to modify the petroleum's gel point temperature. The block copolymer and wax components of the petroleum will have little opportunity to react or interact as the temperature of the petroleum approaches the gel point temperature if the polymer has already interacted with the waxy components of the petroleum above the gel point temperature. Furthermore, if the polymer contains segments which are low enough in substituted methylene units to completely avoid crystallization, these will act as steric blocks to wax or excessive polymer/polymer interaction.

The block copolymers of the present invention are preferably prepared by anionic polymerization. This method of polymerization offers certain unique advantages which makes it extremely useful in the synthesis of the polymers of the present invention. In particular, by the use of anionic polymerization, it is possible to obtain polymers having a narrow molecular weight distribution, to obtain tapered or block polymers, and to control the structure of the polymers derived from conjugated dienes.

Unlike free-radical polymerization reactions, anionic polymerizations can be performed where there is no facile chemical termination step. Of course, termination reactions do occur, but under carefully selected conditions with the monomers of the present invention, using inert solvents and highly pure reactants, the end groups have indefinite lifetimes. The non-terminated chains derived from anionic homopolymerization can be used for the synthesis of block polymers by sequential addition of different monomers as described hereinbefore. Thus anionic polymerization offers flexibility in allowing either block or tapered polymers to be readily produced. As mentioned hereinbefore polymers with narrow molecular weight distribution having better shear stability than those with broader distributions can be produced. Shear stability is a desirable property in polymers used as viscosity index improvers.

Anionic polymerization generally offers a wider latitude of techniques for producing varied structures of conjugated diene polymers. With diene monomers, 1,4- and 1,2-addition can be regulated by the appropriate combination of reaction conditions, including catalyst, solvent type, and temperature. Hydrogenated precursor block copolymers containing butadiene units predominantly in the 1,4-configuration are much more effective in increasing the Viscosity Index than hydrogenated precursor block copolymers containing butadiene units predominantly in the 1,2-configuration.

The polymers of the present invention can be prepared with known metallic and organometallic catalysts such as lithium metal or sodium metal and organo-lithium or organosodium catalysts. Preferred lithium compounds are compounds containing two lithium atoms per compound molecule and include $LiR_L$ Li wherein $R_L$ is an organic compound, preferably a hydrocarbon having at least one carbon atom and preferably from 3 to 6 carbon atoms. Useful dilithium (DiLi) compounds are disclosed in A. F. Halasa et al. Organolithium Catalysis of Olefin and Diene Polymerization, Advances in Organometallic Chemistry, Vol. 18, pages 55–97, Academic Press, Inc. (1980). Suitable organo-lithium catalysts may be represented by the formula $R_2$ Li wherein $R_2$ is a $C_3$ to $C_{30}$, and preferably $C_3$ to $C_{10}$ alkyl, aralkyl, or cycloalkyl group. Specific examples of suitable catalysts include n-propyllithium, isopropyllithium, n-butyllithium; tertiarybutyllithium, n-decyllithium, benzyllithium, 4-phenyl-n-butyl-lithium, etc. Particularly preferred are the butyl-lithiums, i.e., normal-, sec-, iso-, and tertiary-butyllithiums.

An inert diluent, in which the catalyst is soluble, may be employed. By "inert" it is meant that the diluent does not react, although the nature of the solvent may affect the relative amount of 1,2- and 1,4-configuration that is obtained. The inert diluent will generally be a hydrocarbon free of olefinic unsaturation containing from 3 to 16 carbon atoms. Suitable inert diluents include aliphatics, such as n-pentane, n-hexane, isooctane, n-nonane, etc.; alicyclics, such as cyclopentane, cyclohexane, cycloheptane, etc., aromatics such as benzene, toluene, xylene, chlorobenzene, etc. The amount of diluent employed in the preparation is not critical, except that sufficient amounts should be used to solubilize the amount of organolithium catalyst used. Generally, 0.5 to 200, preferably 1 to 50 liters of the diluent per gram mole of organo-lithium catalyst are employed during the preparation of the polymer.

The amount of catalyst employed primarily depends upon the degree of polymerization desired. The term "degree of polymerization," as employed herein, means the total number of monomeric units present in the polymer. ordinarily, each mole of organo-lithium catalyst will generate a mole of polymer. Thus, "degree of polymerization" may be conveniently defined by the generalization:

$$\begin{bmatrix} \text{Degree} \\ \text{of Polymerization} \end{bmatrix} = \frac{[\text{Total Moles of Monomer}]}{[\text{Moles of Catalyst}]}$$

Since to obtain the desired molecular weights, the average number of monomeric units in the polymer will generally be from about 100 to about 2,000. About 0.005 to 0.01 mole of organolithium catalyst per mole of monomer will ordinarily be utilized. The polymerization reaction generally takes place at about −50 degrees to about 150 degrees Centigrade, and preferably at about 20 degrees to about 60 degrees Centigrade. Reaction times as short as 1 minute or as long as 75 hours may be employed. Preferably, the polymerization reaction is carried out for from 4 minutes to 24 hours. Reaction pressure is not critical; pressures may range from atmospheric to super-atmospheric. Preferably for economy and ease of handling, atmospheric pressure is utilized.

In one preferred embodiment the monomers are added sequentially to prepare block copolymers of structures IV and V where X=0, i.e. $B_1$—$A_2$—$B_3$ or $A_1$—$B_2$—$A_3$. For example the preparation of block copolymers of structures IV, i.e. $B_1$—$A_2$—$B_3$, can be prepared by first homopolymerizing isoprene, preferably by 1,4-addition, to form unhydrogenated precursor block $B_1'$ containing predominantly 1,4-isoprene units; introducing butadiene monomer into the reactor containing the segment $B_1'$ and homopolymerizing the butadiene via 1,4 addition to form unhydrogenated precursor $A_2'$ containing at least about 20 mole percent of 1,4-butadiene; and then introducing additional isoprene into the reactor and homopolymerizing the isoprene via 1,4 addition to form unhydrogenated precursor segment $B_3'$ containing predominantly 1,4-isoprene. The block copolymer $B_3'$—$A_2'$—$B_3'$ is then hydrogenated to form the $B_1$—$A_2$—$B_3$ structure.

In a second preferred embodiment, a block copolymer having structures IV and V where X=0, i.e. $B_1$—$A_2$—$B_3$ or $A_1$—$B_2$—$A_3$, can be prepared by altering reaction conditions and/or solvent present during the initial polymerization step. For example, block copolymers having structure IV can be prepared by first polymerizing butadiene by 1,2-addition, to form unhydrogenated precursor block $B_1'$ containing predominantly 1,2-butadiene units. After complete or substantially complete polymerization of block $B_1'$, the reaction conditions/and or solvent are changed so that the butadiene monomer is polymerized (in the presence of $B_1'$) via 1,4-addition mechanism to form unhydrogenated precursor block $A_2'$ containing at least about 20 mole percent of 1,4-configuration butadiene. After complete or substantially complete polymerization of block $A_2'$, then reaction conditions and/or solvent are changed to polymerize butadiene via 1,2-addition to form unhydrogenated precursor segment $B_3'$ containing predominantly 1,2-butadiene. The block copolymer $B_1$—$A_2'$—$B_3'$ is then hydrogenated to form the $B_1$—$A_2$—$B_3$ structure.

In the foregoing discussion concerning the preparation of block copolymers of structures $B_1$—$A_2$—$B_3$ it is to be understood that the A segments need not contain, and usually do not contain, only methylene units derived from the hydrogenation of 1,4-addition butadiene. It may also contain some substituted methylene units derived from the hydrogenation of the 1,2-addition butadiene and or isoprene so long as those substituted methylene units do not exceed about 80 mole percent of the total units. Likewise, segments B, $B_1$ and $B_3$ may contain, and usually do contain, methylene units derived from the hydrogenation of 1,4-addition butadiene, so long as the total methylene units present in B, $B_1$ and $B_3$ do not correspond to a 1,4-polybutadiene content exceeding 20 mole percent.

The hydrogenation of the block copolymers of the present invention is carried out using conventional hydrogenation procedures. The polymer is diluted with an inert solvent, such as those previously mentioned, or in the original polymerization medium, and the polymer solution and hydrogenation catalyst are added to a high pressure autoclave. The autoclave is pressured with hydrogen to about 100 to 3,000 p.s.i.g., and then heated to 50 degrees to 220 degrees Centigrade, (preferably 75 degrees to 150 degrees Centigrade), for about 0.1 to 24 hours, preferably 1 to 24 hours, more preferably 2 to 10 hours, while mixing. The reactor is then depressurized, the catalyst removed by filtering, and the hydrogenated polymer recovered from the solvent by conventional stripping procedures.

The hydrogenation catalyst will generally be used in an amount of 0.1 to 20 weight percent based upon the weight of the block copolymers to be hydrogenated. The specific amount of catalyst employed depends somewhat upon the specific catalyst used. Any material functioning as an olefin hydrogenation catalyst can be used; suitable catalysts include Raney nickel, platinum oxide, platinum on alumina, palladium or charcoal, copper chromate, nickel supported on kieselguhr, molybdenum sulfide, and the like. The best hydrogenation results were obtained with Raney nickel, in large excess, at high temperatures and pressure. Co or Ni carboxylates reduced with aluminum alkyls can also be used.

Hydrogenation is carried out to remove the olefinic unsaturation present in the precursor block copolymer. Hydrogenation may be complete or substantially complete. By complete hydrogenation is meant that all of the olefinic bonds are saturated. By substantially complete hydrogenation is meant that substantially all of the olefinic unsaturation is saturated. By substantially all olefinic unsaturation is meant at least about 80%, preferably at least about 90% of the olefinic unsaturation and most preferably greater than 98%.

Another embodiment of the present invention are tapered block copolymers of hydrogenated 1,2- and 1,4-butadiene. Tapered block copolymers described herein are block copolymers obtained by anionically copolymerizing in hydrocarbon solution in, for example, a batch reactor a mixture containing butadiene monomer to form precursor block copolymers having at least 75 weight percent 1,4-configuration of the 1,4-butadiene and then hydrogenating said precursor block copolymers.

The anionic polymerization and subsequent hydrogenation conditions used in the preparation of the tapered block copolymers are substantially the same as those described hereinbefore. The weight-average molecular weights of these hydrogenated tapered block copolymers are generally the same as those described above.

The weight percent of the butadiene present in the reaction mixture is that which is effective to form tapered block copolymers having at least one high crystalline segment and at least one low crystalline segment. Generally this amount of butadiene is from about 20 to about 90 weight percent. Additionally, the amount of the 1,4-configuration butadiene present in precursor block copolymers must be an amount which is effective to form a high crystalline segment upon hydrogenation of the precursor block copolymers. Generally, this amount is at least about 20 mole percent.

The block copolymers can be recovered by procedures well known in the art. For example, polar materials, such as water or $C_1$ to $C_5$ alkanols can be added to inactivate the catalyst. Preferably, the reaction is terminated by dropping the reaction system into 2 to 10 volumes of methanol containing about 0.1 weight percent antioxidant. After termination of the reaction, the hydrocarbon solution is washed with water or dilute mineral acid. Alternatively, the active polymer solution can be treated with hydrated clays, such as natural Attapulgus clay, which functions to both inactivate the catalyst and to chemically absorb the lithium component. The polymer may be recovered by filtering the resultant polymer solution, drying if necessary, and stripping of remaining inert diluent at elevated temperatures (e.g., 70 degrees to 120 degrees Centigrade) and reduced pressures (e.g., 0.1 to 100 mm. Hg). For the isolation of higher molecular weight block copolymers, steam stripping or precipitation with anti-solvents is preferred.

EXAMPLES

The following examples, which are not intended to be limiting, present certain embodiments and advantages of the present invention. Unless otherwise stated, measurements using weight percent are expressed herein based on the total weight of block copolymer additive.

Experiments were performed on two compositions of crude petroleum denoted ▓ UN1267" and ▓ Sussex ▓ supplied by Halliburton Co. UN1267 is a representative off shore crude oil from the Gulf of Mexico ($T_{gel}$=24.9 degrees Centigrade). Sussex is a representative crude oil from Colorado ($T_{gel}$=45.4 degrees Centigrade). The viscosity of these samples was determined in an RFSII controlled strain rheometer (manufactured by Rheometrics) using a couette geometry.

In each of the examples, the gel point temperature of the sample of crude petroleum was determined with varying concentrations of block copolymer. The petroleum sample and block copolymer were mixed in standard laboratory bottle-mixing equipment for about 5 minutes in a sealed vial to 70 degrees Centigrade to activate the block copolymer and erase the thermal history of the crude petroleum. The crude petroleum and block copolymer were then poured into a couette cup at 55 degrees Centigrade.

The gel point temperature of both samples of crude petroleum was determined with varying concentrations of block copolymer. The change in $T_{gel}$ resulting from the addition of block copolymer was measured. Crude petroleum and varying concentrations of block copolymer were admixed and heated for 5 minutes. Viscosity measurements were taken every 2 seconds at a strain of 100% while lowering the temperature at a cooling rate of 0.5 degrees Centigrade per minute down to 0.0 degrees Centigrade. Graphs plotting viscosity, $\eta^*$, as a function of temperature were prepared for each sample at each concentration of block copolymer tested. The gel point for each sample was found by determining the point of intersection of lines defined by the high temperature viscosity data points (where viscosity varies little with increased temperature) and the line through the viscosity transition region (where viscosity changes the most with increased temperature as denoted by the data points surrounding an inflection point). For example, the plot for UN1267 with 0.5 wt % of block copolymer added shows $\eta^*$ on the Y axis measured in a logarithmic scale with a range from 10 to 0.01 poise and temperature is shown on the X axis measured with a range from 5 to 45 degrees centigrade. The plot shows a decreasing viscosity with increased temperature and an inflection point at approximately 13–14 degrees Centigrade. The gel point is determined to be 14.3 degrees Centigrade as denoted by the intersection of lines defined by the high temperature viscosity data points (T greater than approximately 25 degrees) and the line through the viscosity transition region (T is greater than 13 degrees Centigrade and less then 14 degrees centigrade).

Once gel point temperatures were determined for each sample at varying concentrations, the change in gel point temperature can be plotted as a function of concentration of block copolymer. The following chart shows approximate changes in gel point temperature for approximate concentrations of block copolymer as measured by weight percent of block copolymer:

|  | Conc. Copolymer | Delta $T_{gel}$ |
| --- | --- | --- |
| UN1267 | 0.0 | 0.0 |
|  | .055 | −3.1 |
|  | .10 | −4.6 |
|  | .26 | −8.5 |
|  | .50 | −10.6 |
|  | 1.0 | −10.4 |
| Sussex | 0.0 | 0.0 |
|  | .25 | −2.9 |
|  | .51 | −5.6 |
|  | 1.0 | −8.9 |
|  | 2.0 | −11.3 |

In summary the gel point is lowered by up to 10 degrees Centigrade by addition of approximately 1 weight percent of block copolymer added to the crude petroleum.

Those skilled in the art will appreciate that numerous changes and modifications may be made to the preferred embodiments of the invention and that such changes and modifications may be made without departing from the spirit of the invention. It is therefore intended that the appended claims cover all such equivalent variations as fall within the true spirit and scope of the invention.

What is claimed is:

1. A method of lowering the gel point of a crude petroleum comprising:
   adding to the crude petroleum a block copolymer comprising:
      a first block comprising at least about 10% by weight of said block copolymer and comprising a polyalkylene having more then about 30% crystallinity; and
      a second block comprising at least about 10% by weight of said block copolymer and comprising a polyalkylene having less than about 30% crystallinity;
   said block copolymer being added to said crude petroleum in an amount sufficient to reduce said gel point by at least about 2 degrees Centigrade.

2. The method of claim 1 wherein said block copolymer has a weight average molecular weight less than about 2,000,000 as measured by gel permeation chromatography.

3. The method of claim 1 wherein said block copolymer has a weight average molecular weight between 1,000 and 200,000.

4. The method of claim 1 wherein said block copolymer has a weight average molecular weight between 2,000 and 50,000.

5. The method of claim 1 wherein said block copolymer has a weight average molecular weight between 4,000 and 20,000.

6. The method of claim 1 wherein said block copolymer further comprises at least one additional block, said additional block having a crystallinity below 30%.

7. The method of claim 1 wherein said first block has a crystallinity between about 35% and about 90%.

8. The method of claim 1 wherein the gel point is reduced by at least 3 degrees Centigrade.

9. The method of claim 1 wherein the polyalkylene of said second block is branched.

10. The method of claim 1 wherein the polyalkylene of said second block is substituted.

11. The method of claim 1 wherein said polyalkylene of said second block is substituted with at least one hydroxyl, halo, or amino group.

12. The method of claim 1 wherein said first block is formed from 1,4 butadiene.

13. The method of claim 1 wherein said second block is formed from an isoprene.

14. The method of claim 1 wherein said second block is formed from 1,2 butadiene.

15. The method of claim 1 wherein said polymer has a formula selected from the group comprising:

$$-A_1-B_1-, \qquad \text{(i)}$$

$$-B_1-[A_1-B_2]_x-A_2-B_3-, \text{ and} \qquad \text{(ii)}$$

$$-A_1-[B_1-A_2]_x-B_2-A_3- \qquad \text{(iii)}$$

wherein X is a number from about 0 to about 3, $B_1 B_2$ and $B_3$ are independently each low crystallinity blocks, and $A_1$, $A_2$, and $A_3$ are independently each high crystallinity blocks.

16. The method of claim 10 wherein said polyalkylene of said second block is substituted with an amino group.

17. The method of claim 1 wherein the crystallization temperature of the amphoteric block copolymer is tuned to the crystallization of waxy components of the crude petroleum so that the amphoteric block copolymer and the waxy components of the crude petroleum co-crystallize.

* * * * *

UNITED STATES PATENT AND TRADEMARK OFFICE
CERTIFICATE OF CORRECTION

PATENT NO. : 6,566,454 B2
DATED : May 20, 2003
INVENTOR(S) : Robert K. Prud'homme and Henry S. Ashbaugh It is certified that error appears in the above-identified patent and that said Letters Patent is hereby corrected as shown below:

Column 10,
Line 67, please delete "hydogenated" and insert therefor -- hydrogenated --.

Column 11,
Line 9, please delete "A2" and insert therefor -- $A_2$ --.
Line 46, please delete "CH" and insert therefor -- CH2 --.

Column 14,
Line 13, please delete "$B_3$'" and insert therefor -- $B_1$' --.

Signed and Sealed this

Eighteenth Day of January, 2005

JON W. DUDAS
*Director of the United States Patent and Trademark Office*